United States Patent
Ohtomo et al.

(10) Patent No.: US 9,733,080 B2
(45) Date of Patent: Aug. 15, 2017

(54) WIDE-ANGLE IMAGE PICKUP UNIT AND MEASURING DEVICE

(75) Inventors: Fumio Ohtomo, Itabashi-ku (JP); Kaoru Kumagai, Itabashi-ku (JP); Hitoshi Otani, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 284 days.

(21) Appl. No.: 13/393,354

(22) PCT Filed: Sep. 8, 2010

(86) PCT No.: PCT/JP2010/065890
§ 371 (c)(1), (2), (4) Date: Feb. 29, 2012

(87) PCT Pub. No.: WO2011/040239
PCT Pub. Date: Apr. 7, 2011

(65) Prior Publication Data
US 2012/0162360 A1 Jun. 28, 2012

(30) Foreign Application Priority Data
Oct. 2, 2009 (JP) ................................ 2009-230576

(51) Int. Cl.
*H04N 7/00* (2011.01)
*H04N 13/04* (2006.01)
(Continued)

(52) U.S. Cl.
CPC .............. *G01C 11/06* (2013.01); *G03B 15/00* (2013.01); *H04N 13/0239* (2013.01)

(58) Field of Classification Search
None
See application file for complete search history.

(56) References Cited

U.S. PATENT DOCUMENTS 4,868,682 A * 9/1989 Shimizu et al. ............. 386/324
5,657,073 A * 8/1997 Henley .................. G03B 37/04
348/38
(Continued)

FOREIGN PATENT DOCUMENTS

CN 101261115 A 9/2008
JP 11-95344 A 4/1999
(Continued)

OTHER PUBLICATIONS

International Search Report mailed Dec. 28, 2010 in corresponding PCT application No. PCT/JP2010/065890.
(Continued)

*Primary Examiner* — Mehrdad Dastouri
*Assistant Examiner* — Samuel D Fereja
(74) *Attorney, Agent, or Firm* — Nields, Lemack & Frame, LLC

(57) ABSTRACT

The invention provides a wide-angle image pickup unit, comprising at least two cameras (4a and 4b) to take digital images, wherein the two cameras are arranged in such a manner that optical axes (11a and 11b) of the two cameras cross perpendicularly each other on a same plane and images of wide field angle α with the crossing point O as a center enable to be acquired, and wherein parts of field angles of the two cameras are superimposed on each other and an overlapping portion is formed by the two images superimposed on each other, and stereoscopic measurement can be performed based on the two images of the overlapping portion.

6 Claims, 4 Drawing Sheets

(51) Int. Cl.
  *G01C 11/06*    (2006.01)
  *G03B 15/00*    (2006.01)
  *H04N 13/02*    (2006.01)

(56) References Cited

U.S. PATENT DOCUMENTS

| | | | | |
|---|---|---|---|---|
| 5,703,961 | A | * | 12/1997 | Rogina et al. ............... 382/154 |
| 5,864,360 | A | * | 1/1999 | Okauchi ................. H04N 5/232 |
| | | | | 348/261 |
| 5,988,862 | A | | 11/1999 | Kacyra et al. |
| 6,665,003 | B1 | * | 12/2003 | Peleg ................... G06T 3/4038 |
| | | | | 348/36 |
| 7,126,630 | B1 | * | 10/2006 | Lee et al. ................... 348/218.1 |
| 7,804,996 | B2 | | 9/2010 | Ohtomo et al. |
| 7,940,469 | B2 | | 5/2011 | Kamei |
| 8,483,444 | B2 | * | 7/2013 | Aikawa et al. ............... 382/108 |
| 2002/0110275 | A1 | * | 8/2002 | Rogina ................. G06T 7/0022 |
| | | | | 382/154 |
| 2003/0156751 | A1 | * | 8/2003 | Lee et al. ..................... 382/154 |
| 2004/0066449 | A1 | * | 4/2004 | Givon ................... G03B 35/00 |
| | | | | 348/48 |
| 2004/0246333 | A1 | * | 12/2004 | Steuart, III ........... G03B 35/08 |
| | | | | 348/36 |
| 2005/0068418 | A1 | * | 3/2005 | Kaneko ............. H04N 13/0246 |
| | | | | 348/187 |
| 2005/0286760 | A1 | * | 12/2005 | Ohtomo et al. ............. 382/154 |
| 2006/0012675 | A1 | * | 1/2006 | Alpaslan et al. ............... 348/51 |
| 2006/0018509 | A1 | * | 1/2006 | Miyoshi ................. G06T 5/006 |
| | | | | 382/104 |
| 2006/0072020 | A1 | * | 4/2006 | McCutchen ............... 348/218.1 |
| 2007/0097206 | A1 | * | 5/2007 | Houvener ............. G03B 35/08 |
| | | | | 348/26 |
| 2007/0126863 | A1 | * | 6/2007 | Prechtl et al. ................... 348/43 |
| 2007/0182812 | A1 | * | 8/2007 | Ritchey ................ H04N 5/2254 |
| | | | | 348/36 |
| 2007/0263924 | A1 | * | 11/2007 | Kochi et al. ................... 382/154 |
| 2007/0285554 | A1 | * | 12/2007 | Givon ..................... G03H 1/268 |
| | | | | 348/340 |
| 2008/0037829 | A1 | * | 2/2008 | Givon ................. G06K 9/3216 |
| | | | | 382/107 |
| 2008/0298674 | A1 | * | 12/2008 | Baker et al. ................... 382/154 |
| 2009/0138233 | A1 | * | 5/2009 | Kludas et al. ................. 702/158 |
| 2009/0237490 | A1 | * | 9/2009 | Nelson, Jr. ........... H04N 5/2252 |
| | | | | 348/43 |
| 2010/0026982 | A1 | * | 2/2010 | Kludas et al. ................. 356/4.01 |
| 2010/0045773 | A1 | * | 2/2010 | Ritchey ................. G02B 13/06 |
| | | | | 348/36 |
| 2010/0091090 | A1 | * | 4/2010 | Koyanagi ....................... 348/36 |
| 2010/0283842 | A1 | * | 11/2010 | Guissin et al. ................... 348/68 |

FOREIGN PATENT DOCUMENTS

| | | |
|---|---|---|
| JP | 2000-194983 A | 7/2000 |
| JP | 2002-31528 A | 1/2002 |
| JP | 2004-151043 A | 5/2004 |
| JP | 2004-531113 A | 10/2004 |
| JP | 2005-165468 A | 6/2005 |
| JP | 2005-295495 A | 10/2005 |
| JP | 2006-10376 A | 1/2006 |
| JP | 2006-119591 A | 5/2006 |
| JP | 3781281 B2 | 5/2006 |
| JP | 2008-5478 A | 1/2008 |
| JP | 2008-102620 A | 5/2008 |
| JP | 2008-204326 A | 9/2008 |
| JP | 2010-85849 A | 4/2010 |
| JP | 2010-197186 A | 9/2010 |
| WO | 02/065786 A1 | 8/2002 |

OTHER PUBLICATIONS

International Preliminary Report on Patentability issued May 8, 2012 in corresponding PCT application No. PCT/JP2010/065890.
Chinese communication dated Dec. 5, 2014 in corresponding Chinese patent application No. 201080044489.2.

* cited by examiner

WIDE-ANGLE IMAGE PICKUP UNIT AND MEASURING DEVICE

TECHNICAL FIELD

The present invention relates to a wide-angle image pickup unit, which can take an image at a wide field angle of 100° or more and has a surveying function. The invention also relates to a measuring system using the wide-angle image pickup unit.

BACKGROUND ART

As a wide-angle image pickup unit, which can take an image at a wide field angle, a wide-angle camera is known, which uses a wide-angle lens. Also, a total circumferential camera or the like are known, in which a plurality of cameras are disposed in a circumferential direction and images in the total circumferential direction can be taken.

In recent years, there has been a tendency that image data associated with positional data have been increasingly used as map data, and a wide-angle image pickup unit is used to acquire such image data. The wide-angle image pickup unit is installed on a mobile object such as an automobile, and takes images of sceneries around a road at a predetermined interval according to the automobile running.

To use the images thus taken as image data for the preparation of map, it is necessary to identify a position where the object to be measured has been taken or a position of the object to be measured in order to associate the images with the map data. It has been practiced in the past to install a position measuring unit separately on the mobile object, to measure a building with special features or a telephone pole or the like by this position measuring unit, and to associate the image data with the map data.

As described above, the image data and the positional data have been acquired separately in the past. Further, a construction feature of the measuring system was complicated. Troublesome procedures and much time have been needed for associating the image data with the positional data, and these have been placing much burden on an operator.

To solve the problems as described above, the present invention provides a wide-angle image pickup unit and a measuring system, by which it is possible to take an image at wide field angle and to measure a distance to the object to be measured at the same time.

PRIOR ART REFERENCES

[Patent Document 1] JP-A-2006-119591
[Patent Document 2] JP-A-2005-165468
[Patent Document 3] JP-A-2006-10376
[Patent Document 4] JP-A-2010-85849
[Patent Document 5] JP-A-2008-204326

DISCLOSURE OF THE INVENTION

The present invention provides a wide-angle image pickup unit, comprising at least two cameras to take digital images, wherein the two cameras are arranged in such a manner that optical axes of the two cameras cross perpendicularly each other on a same plane and images of wide field angle with the crossing point as a center enable to be acquired, and wherein parts of field angles of the two cameras are superimposed on each other and an overlapping portion is formed by the two images superimposed on each other, and stereoscopic measurement can be performed based on the two images of the overlapping portion.

Also, the present invention provides the wide-angle image pickup unit as described above, wherein a predetermined number of cameras are arranged at predetermined angular intervals so that a total circumferential image is adopted to be taken. Further, the present invention provides the wide-angle image pickup unit as described above, wherein two images are acquired to form the overlapping portion by at least one set of adjacent cameras, and the stereoscopic measurement is performed by the overlapping portion. Also, the present invention provides the wide-angle image pickup unit as described above, wherein the total circumferential image is formed by the overlapping portion. Also, the present invention provides the wide-angle image pickup unit as described above, further comprising a calculation processing unit, wherein the calculation processing unit calculates three-dimensional coordinates of an object to be measured being present on the overlapping portion based on a distance between the two cameras, on a focal distance of the camera, and on the images superimposed on each other on the overlapping portion. The present invention provides the wide-angle image pickup unit as described above, further comprising a display unit with a touch panel function, wherein three-dimensional coordinates of a designated position are determined by designating an arbitrary position on the overlapping portion displayed on the display unit.

The present invention provides a measuring system, comprising a wide-angle image pickup unit and a calculation processing unit, wherein the wide-angle image pickup unit has at least two cameras to take digital images, and the two cameras are arranged in such a manner that optical axes of the two cameras cross perpendicularly each other on a same plane and images of wide field angle with the crossing point as a center enable to be acquired, and parts of field angles of the two cameras are superimposed on each other and an overlapping portion is formed, and wherein the calculation processing unit calculates three-dimensional coordinates of an object to be measured being present on the overlapping portion by stereoscopic measurement based on a distance between the two cameras, on a focal distance of the camera, and on the images superimposed on each other on the overlapping portion.

Further, the present invention provides a measuring system as described above, further comprising a displacement amount measuring means, wherein the calculation processing unit performs measurement of three-dimensional coordinates by the stereoscopic measurement in case an object to be measured is at a short distance and is present on the overlapping portion, and the calculation processing unit acquires three-dimensional coordinates of an object to be measured according to images taken from two different points and according to a distance between the two points obtained by the displacement amount measuring means in case an object to be measured is at a long distance. Also, the present invention provides a measuring system as described above, wherein the displacement amount measuring means is a GPS unit, and the GPS unit, the wide-angle image pickup unit, and the calculation processing unit are installed on a mobile object, and a present position of the mobile object is measured by the GPS unit. Further, the present invention provides a measuring system as described above, further comprising a display unit having a touch panel function, wherein three-dimensional coordinates at a designated position are measured by designating an arbitrary position on the overlapping portion displayed on the display unit.

LEGEND OF REFERENCE NUMERALS

Figure 1:
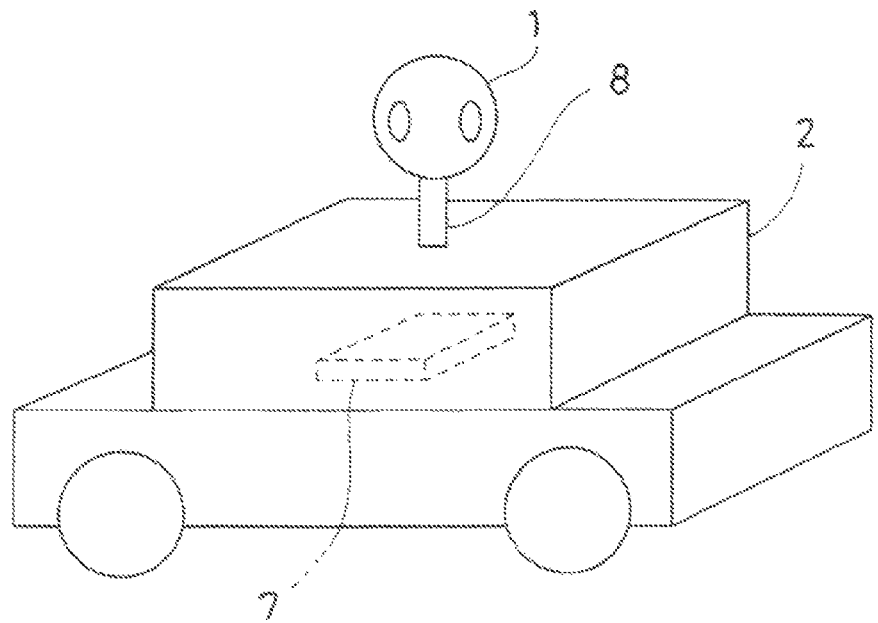
FIG. 1 is a schematical drawing to show a case where a wide-angle image pickup unit according to the present invention is installed on an automobile.

1 Wide-angle image pickup unit
2 Automobile
3 Case
4 Camera
7 Calculation processing unit
11 Optical axis
12 Photodetection element
13 Objective lens
14 Photodetecting surface
16 Measuring system
18 Display unit
21 Input/output control unit
22 Arithmetic unit
23 Storage unit
25 Overlapping portion
26 Object to be measured

BEST MODE FOR CARRYING OUT THE INVENTION

Description will be given below on an embodiment of the present invention by referring to the attached drawings.

FIG. 1 shows a case where a wide-angle image pickup unit 1 according to the present invention is installed on a roof of an automobile 2, which is a mobile object. On the automobile 2, a calculation processing unit 7 is installed, for performing measurement such as a distance measurement or the like based on image signals or the like from the wide-angle image pickup unit 1.

Figure 2:
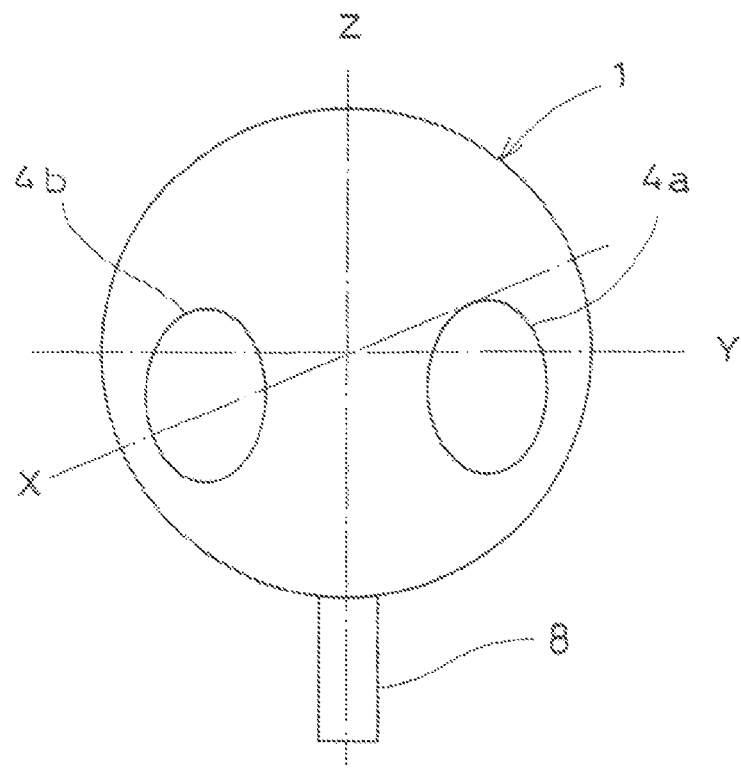
FIG. 2 is a schematical perspective view of the wide-angle image pickup unit according to an embodiment of the present invention.
Figure 3:
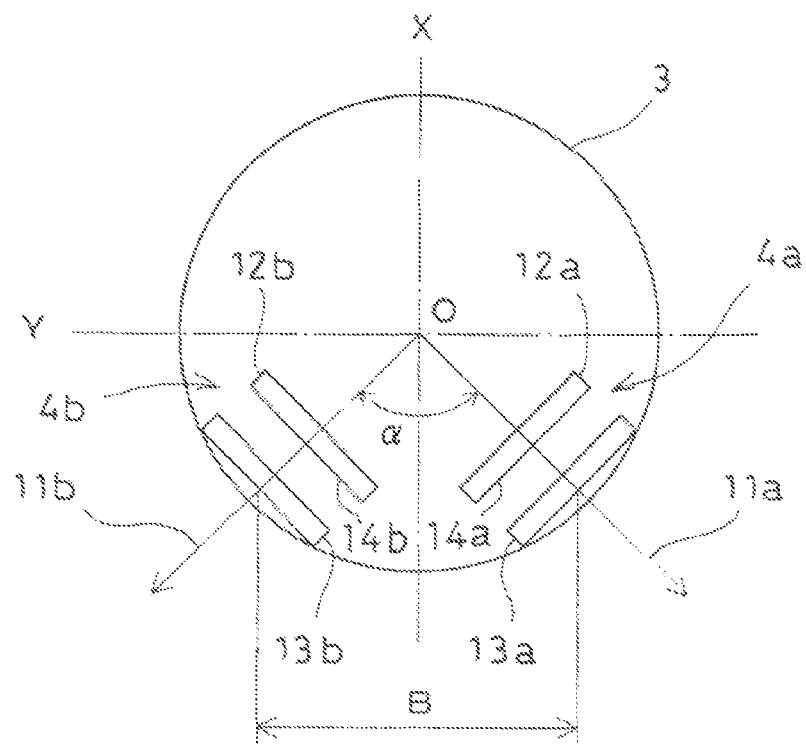
FIG. 3 is a drawing to explain optical arrangement of a camera in the wide-angle image pickup unit.
Figure 4:
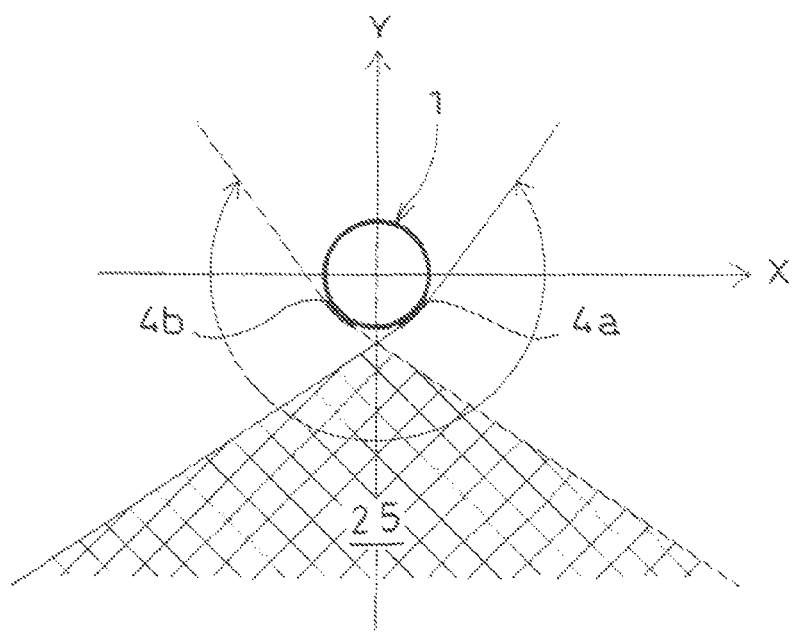
FIG. 4 is a drawing to explain a field angle and an overlapping portion of the wide-angle image pickup unit.

FIG. 2 to FIG. 4 each represents a general feature of the wide-angle image pickup unit 1 according to the present invention. Now, description will be given below on the wide-angle image pickup unit 1.

At least two cameras 4a and 4b are incorporated in a case with a shape as required, e.g. in a case 3 of a spherical shape. The case 3 is designed in watertight construction, and the case 3 is mounted on the roof of the automobile 2 via an adaptor 8.

In an optical system of each of the cameras 4a and 4b, optical axes 11a and 11b are directed in a forward direction of a lens, and the optical axes are arranged in a radial direction. That is, the optical axes 11a and 11b (see FIG. 3) are located on a same horizontal plane. The optical axes 11a and 11b cross each other at one point, preferably at a center point O of the case 3. Further, an angle α formed by the optical axes 11a and 11b is at a predetermined angle with the center point O as a center.

The angle α is determined by taking due consideration on a field angle of the optical system of each of the cameras 4a and 4b. For instance, in case the optical system of each of the cameras 4a and 4b has a wide field angle of 220°, the angle α is set to 90°. Therefore, the field angle, which can be taken by the wide-angle image pickup unit 1, is set to 310°, and the field angle where the optical system of the cameras 4a and 4b are overlapped on each other is set to 110°. A camera having a wide field angle of 220° is described in the Patent Application 2008-256477 (JP-A-2010-85849/the Patent Document 4), which has been filed by the present applicant.

First, description will be given on the cameras 4a and 4b. The cameras 4a and 4b will be described below as a camera 4 because they are designed in the same construction.

The camera 4 has a photodetection element 12 and an objective lens 13, which constitutes the optical system, and the camera 4 acquires a digital image. As the photodetection element 12, CCD, CMOS, etc. are used, each of which is an aggregate of pixels, and the photodetection element 12 is designed so that it can identify a position of the photodetecting pixel on the photodetecting surface (image pickup surface) 14.

The wide-angle image pickup unit 1 takes images at wide-angle of 310° by the cameras 4a and 4b, and image signals from the cameras 4a and 4b are sent to the calculation processing unit 7.

Next, referring to FIG. 5, description will be given on a measuring system 16.

The measuring system 16 primarily comprises the wide-angle image pickup unit 1, the calculation processing unit 7, an operation unit 17, and a display unit 18.

Figure 5:
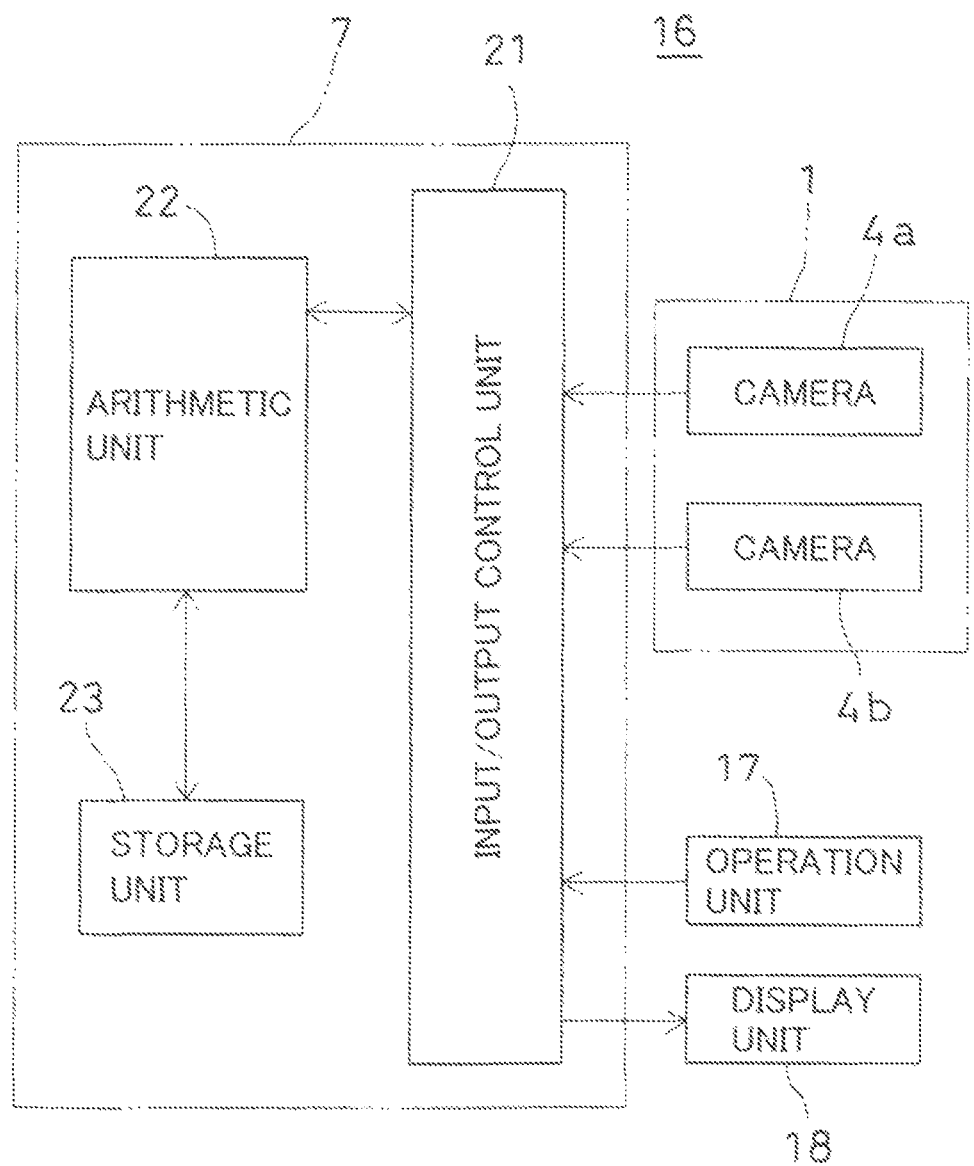
FIG. 5 is a block diagram of a measuring system according to the embodiment of the present invention.

As shown in FIG. 5, the calculation processing unit 7 has an input/output control unit 21, an arithmetic unit 22, and a storage unit 23. The input/output control unit 21 inputs image signals from the cameras 4a and 4b alternately in time series to the arithmetic unit 22, and an operation instruction signal from the operation unit 17 is inputted to the arithmetic unit 22. The image taken by the camera 4 and further, the result of surveying operation or the like are sent to the display unit 18 via the input/output control unit 21.

The storage unit 23 stores the signals from the cameras 4a and 4b and from the operation unit 17 via the arithmetic unit 22.

Data such as image signals from the cameras 4a and 4b are stored in the storage unit 23. Further, the following programs are stored in the storage unit 23: an image processing program for performing image processing such as extraction of an object to be measured from the image signal, a calculation program for calculating a distance to the object to be measured and three-dimensional coordinates according to the image signal, an image display program for displaying the image acquired or a result of calculation on the display unit 18, and various other types of programs are stored in the storage unit 23.

The arithmetic unit 22 extracts the object to be measured from the image signal according to the image processing program. By the calculation program, the distance to the object to be measured and the three-dimensional coordinates of the object to be measured are calculated by the stereoscopic measurement based on two images from the cameras 4a and 4b according to the calculation program.

Now, description will be given on operation of the wide-angle image pickup unit 1 and the measuring system 16.

As shown in FIG. 4, the wide-angle image pickup unit 1 can acquire images at a wide-angle of 310° by two cameras 4a and 4b. Two image data from the cameras 4a and 4b are sent to the calculation processing unit 7. At the calculation processing unit 7, the two images are synthesized, and the synthesized image is displayed on the display unit 18.

These two images are overlapped on each other over a field angle of 110°. In FIG. 4, the overlapped portion 25 is shown by cross hatching. The overlapping portion 25 represents images taken by the two cameras 4a and 4b, which are in a relation to each other already known, and the object to be measured being present within the overlapping portion 25 can be measured by the stereoscopic measurement.

Figure 6:
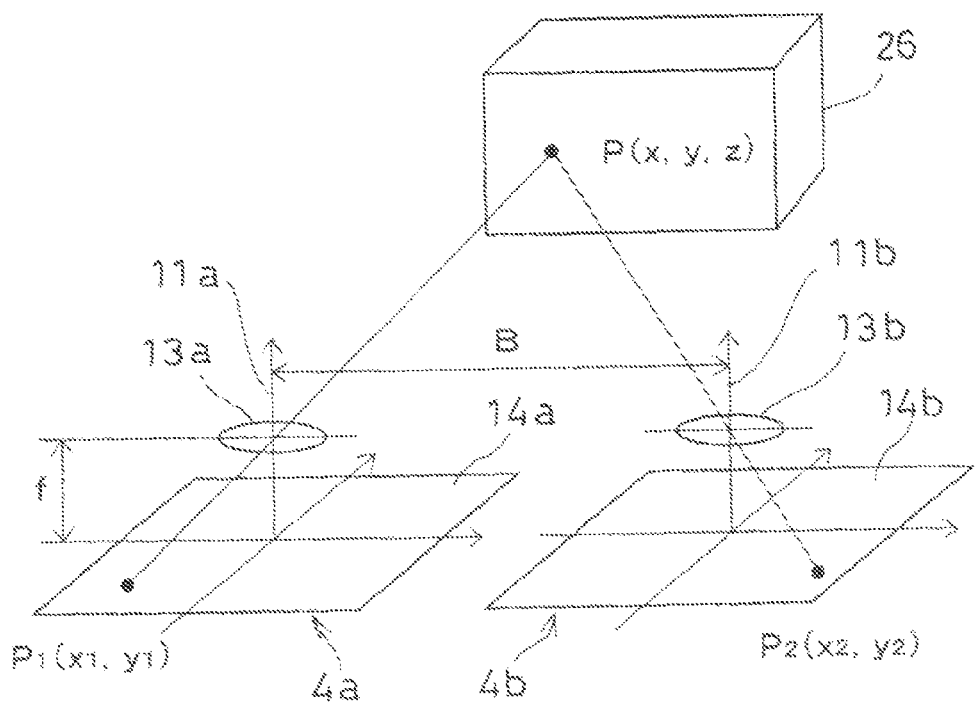
FIG. 6 is a drawing to explain stereoscopic measurement by using two images.

Now, referring to FIG. 6, description will be given on the stereoscopic measurement based on the two images. In FIG. 6, the symbol B denotes a distance between lens centers of two cameras 4a and 4b (photographing base line length), the symbol f represents a focal distance of each of the objective lenses 13a and 13b, the symbols (x1, y1) stand for image coordinates of the camera 4a, the symbols (x2, y2) represent image coordinates of the camera 4b, and the symbols (x, y, z) stand for three dimensional coordinates of the wide-angle image pickup unit 1. Numeral 26 represents the object to be measured.

To facilitate the explanation, optical axes 11a and 11b of the cameras 4a and 4b are set in parallel to each other in FIG. 6. When there is an angle between the optical axes of the cameras 4a and 4b as in the case of the present embodiment, the result obtained can be amended to match the angle.

The relations shown by the following equations exist between the measuring point P (x, y, z) on the object to be measured 26 and coordinates of the matching points P1 (x1, y1) and P2 (x2, y2) on the photodetecting surfaces 14a and 14b respectively:

$$x = x1 \times B/(x1-x2)$$

$$y = y1 \times B/(x1-x2)$$

$$z = f \times B/(x1-x2)$$

where

B: Photographing base line length

Therefore, from the equations as given above, relative positional coordinates P (x, y, z) in spatial coordinates of the object P can be obtained.

To simplify the explanation, an example is taken here on the calculation when the cameras are positioned within the same plane. Normally, however, it is difficult to take each of the images with the optical axis perpendicularly crossing the base line of photographing, and relative orientation is performed, by which relative tilting of each of the cameras is obtained. Regarding relative orientation, it is described in JP-A-2005-165468 (the Patent Document 2), JP-A-2006-10376 (the Patent Document 3), etc.

The measuring point P can be selected by edge processing of the extracted images of the object to be measured 26 or by other processing.

An image of wide field angle can be acquired by the wide-angle image pickup unit 1, and a distance to the object to be measured 26 can be determined at the same time.

By using the display unit 18 as a touch panel, the measuring point p can be selected from the display unit 18, and the distance can be determined.

For instance, it may be selected either the image to be displayed on the display unit 18 is set to an overall image with the field angle of 310° or it is set as the overlapping portion 25. Then, with the overlapping portion 25 displayed on the display unit 18, a position to be measured in the image can be indicated by using means such as a touch pen. By indicating the measuring point P in the image, a matching point P1 (x1, y1) on the photodetecting surface 14a of the camera 4a and a matching point P2 (x2, y2) on the photodetecting surface 14b of the camera 4b can be given. Then, the values of x and y can be determined by the equations as given above.

An accuracy of the stereoscopic measurement as described above can be expressed as follows:

Plane accuracy: $\Delta XY = H \times \Delta p/f$

Accuracy in depth direction: $\Delta Z = (H/f) \times (H/B) \times \Delta p$ where H: Distance to the object to be measured f: Focal distance of camera B: Photographing base line length $\Delta p$: Pixel size of the camera Therefore, when a long distance is measured by the stereoscopic measurement based on an image at one geographical point as acquired by the wide-angle image pickup unit 1, the accuracy will be lower.

Accordingly, when measurement is made on a long distance, the wide-angle image pickup unit 1 should be moved and the stereoscopic measurement should be carried out based on two images acquired at two geographical points and also based on a distance between the two geographical points. The distance between two geographical points may be obtained by actually determining a moving distance or may be obtained by displacement amount measuring means, which is to be described later.

When the image of the object to be measured can be taken continuously while moving, the stereoscopic measurement should be performed based on two images acquired at the two geographical points and based on the distance between the two geographical points. When the image of the object to be measured cannot be continuously taken because the wide-angle image pickup unit 1 is moving, the stereoscopic measurement should be performed by the overlapped images of the cameras 4a and 4b. Two stereoscopic measurements as given above may be performed by switching-over, depending on the distance and the position of the object to be measured.

Next, description will be given on a case where a GPS unit is installed on the automobile 2, and the present position of the automobile 2 can be determined.

The GPS unit is so designed that the present position can be measured at real time according to signals from a plurality of satellites. Positions of an image pickup point of two points can be measured by the wide-angle image pickup unit 1. Further, the distance between the two points can be calculated. Thus, it is possible to determine three-dimensional coordinates of the object to be measured while moving.

When the measurement is performed while moving, in case where the object to be measured is at a short distance, e.g. in case of a building or the like, which is present near the road, relative speed with respect to the automobile 2 is high. In the measurement, in which images are taken between two points and the GPS unit is used, it is difficult to perform measurement because the images are separated too far from each other.

Therefore, in case of a short distance, measurement is performed on an image acquired at one geographical point by the wide-angle image pickup unit 1. In case of a long distance, measurement is performed on two images acquired at two geographical points. Thus, the measurement of three-dimensional coordinates can be carried out under optimal condition from short distance to long distance.

When the GPS unit is used, the position of the automobile 2 on ground coordinate system can be determined. Thus, the measurement result according to the image acquired at one geographical point by the wide-angle image pickup unit 1 can be replaced to the ground coordinate system, and measurement result from short distance to long distance can be used as map data.

Instead of the GPS unit, IMU (inertial measuring unit) may be used. By this IMU, a relative position of a mobile object where IMU is installed can be determined with high accuracy. Therefore, by using the IMU, relative positional relation of two geographical points, for which images are taken, is determined, and the stereoscopic measurement is carried out. Both the GPS unit and the IMU can fulfill the functions as displacement amount measuring means.

Also, by associating the image acquired by the wide-angle image pickup unit 1 with the result of measurement of the three-dimensional coordinates, it is possible to obtain an image with positional data.

In the embodiment as given above, it is described that a wide-angle image can be acquired by the two cameras 4a and 4b. By disposing three or more cameras 4 along the circumferential direction, these cameras 4 can fulfill a function of the total circumferential camera.

Figure 7:
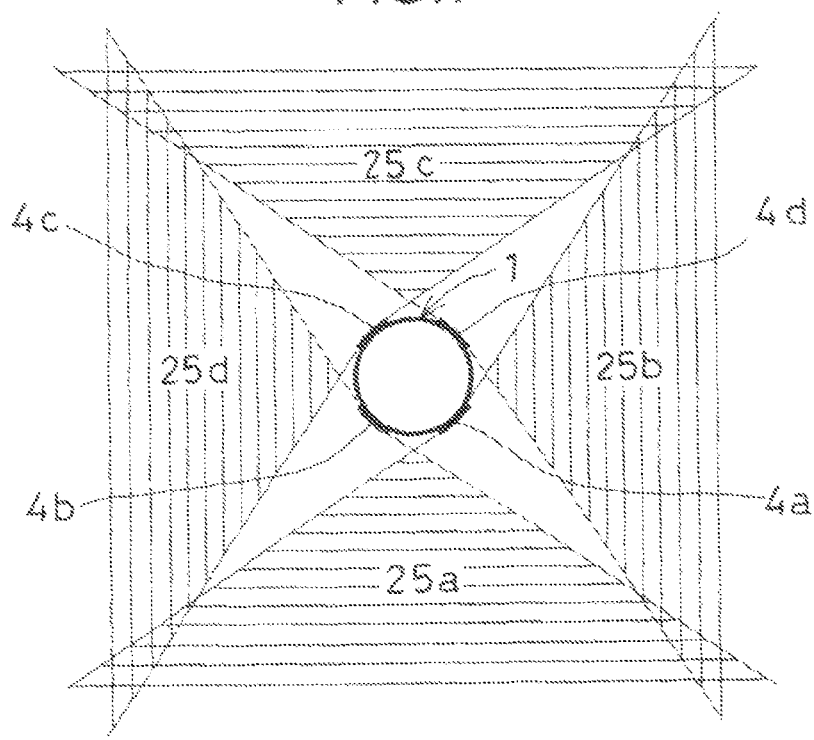
FIG. 7 is a drawing to explain the field angle and the overlapping portion when four wide-angle cameras are disposed.

For instance, as shown in FIG. 7, when cameras 4a, 4b, 4c and 4d with a wide field angle of 220° are installed in the circumferential direction with an interval angle of 90° each, a total circumferential image can be acquired. Further, overlapping portions 25a, 25b, 25c and 25d are resulted between the cameras adjacent to each other. As a result, an object to be measured, which is present in the overlapping portions 25a, 25b, 25c and 25d, can be measured.

In FIG. 7, blank portions, where no hatching is put, are the portions of blind spot where stereoscopic measurement cannot be performed. However, the portions of blind spot are limited only to the vicinity of the wide-angle image pickup unit 1, and there is little influence on actual measurement. For the purpose of reducing the portions of blind spot, the number of the cameras 4 should be increased, i.e. five of the cameras 4 should be installed with angular interval of 72° or six of the cameras 4 should be installed with angular interval of 60°. Further, the number of the cameras 4 can be adequately determined so that adequate overlapping portions 25 can be obtained, depending on the field angle of the cameras 4. The cameras 4 to be used are not necessarily wide-angle cameras. It would suffice if the number and the arrangement of the cameras 4 are determined in such manner that adequate overlapping portions 25 including the object to be measured 26 can be provided.

Although, the optical axes of the cameras 4 are arranged on horizontal plane in the embodiment as given above, the optical axes may be arranged on a vertical plane or to have wide-angle in up-to-bottom direction.

In case it is arranged that the total circumferential image can be acquired by the wide-angle image pickup unit 1, if the overlapping portions 25a, 25b, 25c and 25d are displayed on the display unit 18, the total circumferential image can be obtained only by the overlapping portions. Therefore, when the total circumferential image containing only the overlapping portions are displayed on the display unit 18 and an arbitrary position of an arbitrary object in arbitrary direction over total circumference is designated on the display unit 18 by using a touch pen, it is possible to perform the measurement of the three-dimensional coordinates at any arbitrary position. Then, without the need of directing the measuring device in the measuring direction each time, the three-dimensional coordinates of the object to be measured, which is present over total circumference, can be measured by a single set of procedure.

Also, in order to acquire the total circumferential image, it may be so designed that the overlapping portions 25 can be provided by at least one set of the adjacent cameras when the cameras are installed.

In the above, description has been given on a case where the wide-angle image pickup unit 1 is installed on the automobile 2, while the wide-angle image pickup unit 1 may be installed on a mobile object such as a construction machine, an agricultural machine, etc. other than the automobile.

Also, it may be so arranged that the calculation processing unit 7 is installed in the case 3, and the wide-angle image pickup unit 1 may be integrated with the calculation processing unit 7. Further, the display unit 18 may be integrated so that the wide-angle image pickup unit 1 has a distance measuring function, and that the wide-angle image can be taken by the wide-angle image pickup unit 1 and three-dimensional coordinates of the object to be measured can be determined.

INDUSTRIAL APPLICABILITY

The present invention provides a wide-angle image pickup unit, comprising at least two cameras to take digital images, wherein the two cameras are arranged in such a manner that optical axes of the two cameras cross perpendicularly each other on a same plane and images of wide field angle with the crossing point as a center enale to be acquired, and wherein parts of field angles of the two cameras are superimposed on each other and an overlapping portion is formed by the two images superimposed on each other, and stereoscopic measurement can be performed based on the two images of the overlapping portion. As a result, it is possible to take the image of wide field angle and to acquire an image for measuring three-dimensional coordinates.

Also, the present invention provides the wide-angle image pickup unit as described above, wherein a predetermined number of cameras are arranged at predetermined angular intervals so that a total circumferential image is adopted to be taken. As a result, it is possible to take the total circumferential image and to acquire an image for measuring the three-dimensional coordinates.

Further, the present invention provides the wide-angle image pickup unit as described above, wherein the total circumferential image is formed by the overlapping portion. As a result, it is possible to determine the three-dimensional coordinates of an arbitrary position of an arbitrary object in an arbitrary direction over total circumference.

Also, the present invention provides the wide-angle image pickup unit as described above, further comprising a calculation processing unit, wherein the calculation processing unit calculates three-dimensional coordinates of an object to be measured being present on the overlapping portion based on a distance between the two cameras, on a focal distance of the camera, and on the images superimposed on each other on the overlapping portion. As a result, it is possible to acquire the image of wide field angle and also to determine the three-dimensional coordinates of the object to be measured.

Further, the present invention provides the wide-angle image pickup unit as described above, further comprising a display unit with a touch panel function, wherein three-dimensional coordinates of a designated position are determined by designating an arbitrary position on the overlapping portion displayed on the display unit. As a result, it is possible to measure an arbitrary point at an arbitrary position as desired by one-touch operation.

The present invention provides a measuring system, comprising a wide-angle image pickup unit and a calculation processing unit, wherein the wide-angle image pickup unit has at least two cameras to take digital images, and the two cameras are arranged in such a manner that optical axes of the two cameras cross perpendicularly each other on a same plane and images of wide field angle with the crossing point as a center enable to be acquired, and parts of field angles of the two cameras are superimposed on each other and an overlapping portion is formed, and wherein the calculation processing unit calculates three-dimensional coordinates of an object to be measured being present on the overlapping portion by stereoscopic measurement based on a distance between the two cameras, on a focal distance of the camera, and on the images superimposed on each other on the overlapping portion. As a result, it is possible to acquire the image of wide field angle and also to determine the three-dimensional coordinates of an object to be measured.

Also, the present invention provides a measuring system as described above, further comprising a displacement amount measuring means, wherein the calculation processing unit performs measurement of three-dimensional coordinates by the stereoscopic measurement in case an object to be measured is at short distance and is present on the overlapping portion, and the calculation processing unit acquires three-dimensional coordinates of an object to be measured according to images taken from two different points and according to a distance between the two points obtained by the displacement amount measuring means in case an object to be measured is at long distance. As a result, it is possible to perform measurement in the range from short distance to long distance.

Further, the present invention provides a measuring system as described above, wherein the displacement amount measuring means is a GPS unit, and the GPS unit, the wide-angle image pickup unit, and the calculation processing unit are installed on a mobile object, and a present position of the mobile object is measured by the GPS unit. As a result, while moving by the mobile object, it is possible to measure a distance from an object to be measured, which is located at a short distance, to an object to be measured, which is located at a long distance.

Also, the present invention provides a measuring system as described above, further comprising a display unit having a touch panel function, wherein three-dimensional coordinates at a designated position are measured by designating an arbitrary position on the overlapping portion displayed on the display unit. As a result, it is possible to measure the arbitrary point at the arbitrary position as desired by one-touch operation.

The invention claimed is:

1. A wide-angle image pickup unit, comprising a predetermined number of cameras to take digital images, wherein said predetermined number of cameras are arranged such that optical axes of said predetermined number of cameras cross each other on a same plane at one crossing point and said optical axes of said predetermined number of cameras are provided in radial direction at a predetermined angular interval so that total circumferential images with said crossing point as a center are acquired, wherein a field angle of each camera of said predetermined number of cameras is equal in size and is of a size such that end portions of field angles of adjacent cameras of said predetermined number of cameras are superimposed on each other and form overlapping portions, wherein end portions of adjacent overlapping portions are further superimposed on each other, and an angle formed by said optical axes of said adjacent cameras is 360° divided by said predetermined number of cameras, and the size is such that said overlapping portions are formed over a total circumference, wherein a total circumferential image is obtained using only said overlapping portions formed by said predetermined number of cameras and stereoscopic measurement is performed in an arbitrary direction and at an arbitrary position based on two images of said overlapping portion, and wherein said wide-angle image pickup unit further comprises a displacement amount measuring means and a calculation processing unit, wherein said calculation processing unit performs measurement of three-dimensional coordinates by said stereoscopic measurement in case an object to be measured is at a short distance and is present on said overlapping portion, and said calculation processing unit acquires three-dimensional coordinates of an object to be measured according to images taken from two different points and according to a distance between said two points obtained by said displacement amount measuring means in case an object to be measured is at a long distance.

2. A wide-angle image pickup unit according to claim 1, wherein said calculation processing unit calculates three-dimensional coordinates of an object to be measured being present on said overlapping portion based on a distance between said two cameras, on a focal distance of the camera, and on the images superimposed on each other on said overlapping portion.

3. A wide-angle image pickup unit according to claim 2, further comprising a display unit with a touch panel function, wherein three-dimensional coordinates of a designated position are determined by designating an arbitrary position on said overlapping portion displayed on said display unit.

4. A measuring system comprising a wide-angle image pickup unit, a displacement amount measuring means, and a calculation processing unit, wherein said wide-angle image pickup unit has a predetermined number of cameras to take digital images, and said predetermined number of cameras are arranged such that optical axes of said predetermined number of cameras cross each other on a same plane at one crossing point and said optical axes of said predetermined number of cameras are provided in radial direction at a predetermined angular interval such that total circumference images with said crossing point as a center are acquired and wherein a field angle of each camera of said predetermined number of cameras is equal in size and is of a size such that end portions of field angles of adjacent cameras of said predetermined number of cameras are superimposed on each other and form overlapping portions, wherein end portions of adjacent overlapping portions are further superimposed on each other, and an angle formed by said optical axes of said adjacent cameras of said predetermined number of cameras is 360° divided by said predetermined number of cameras and the size is such that said overlapping portions are formed over a total circumference, wherein a total circumferential image is obtained using only said overlapping portions formed by said predetermined number of cameras, wherein said calculation processing unit calculates three-dimensional coordinates of an object to be measured being present in an arbitrary direction and at an arbitrary position on said overlapping portion by stereoscopic measurement based on a distance between said adjacent cameras, on a focal distance of said camera, and on the images superimposed on each other on said overlapping portion, and wherein said calculation processing unit performs measurement of three-dimensional coordinates by said stereoscopic measurement in case an object to be measured is at a short distance and is present on said overlapping portion, and said calculation processing unit acquires three-dimensional coordinates of an object to be measured according to images taken from two different points and according to a distance between said two points obtained by said displacement amount measuring means in case an object to be measured is at a long distance.

5. A measuring system according to claim 4, further comprising a display unit having a touch panel function, wherein three-dimensional coordinates at a designated position are measured by designating an arbitrary position on said overlapping portion displayed on said display unit.

6. A measuring system according claim 4, wherein said displacement amount measuring means is a GPS unit, and said GPS unit, said wide-angle image pickup unit, and said calculation processing unit are installed on a mobile object, and a present position of the mobile object is measured by said GPS unit.

* * * * *